(No Model.)
T. PATE.
PLOW.
No. 359,465. Patented Mar. 15, 1887.
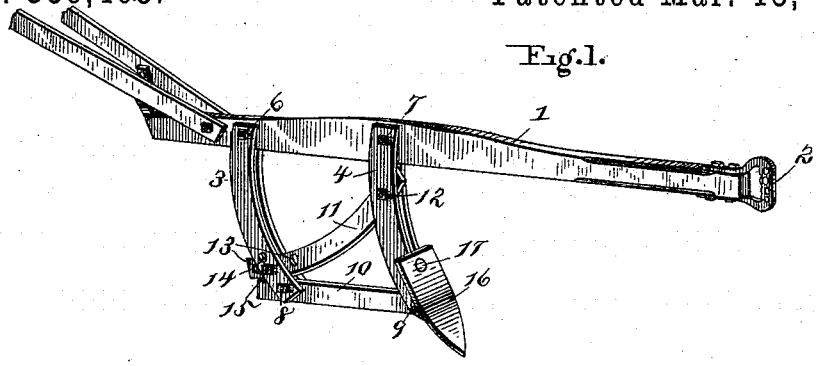
Fig. 1.
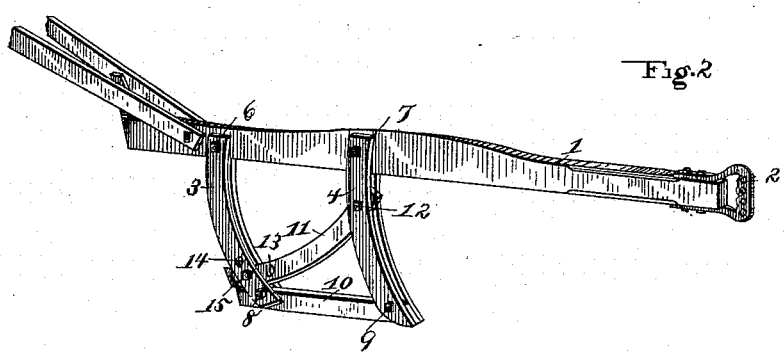
Fig. 2.
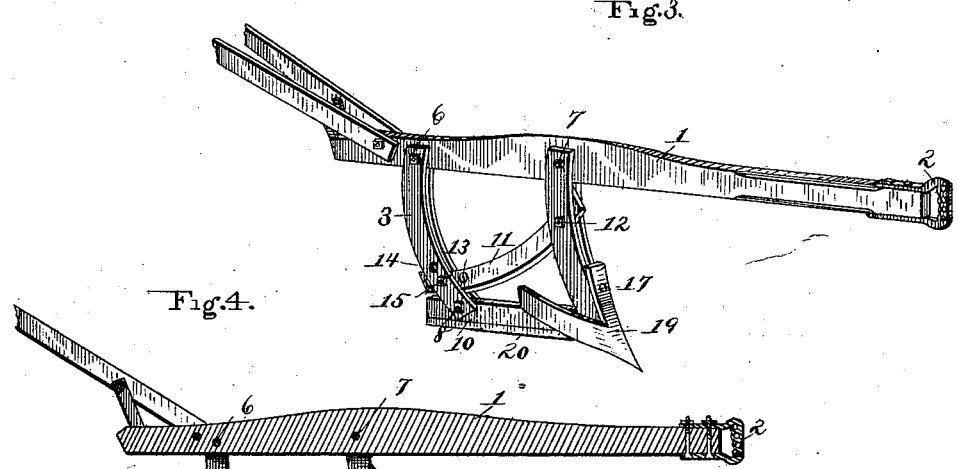
Fig. 3.
Fig. 4.
Witnesses:
F. L. Ourand
Bennett S. Jones
Inventor
Travis Pate,
by his Attorneys
Louis Bagger & Co.
N. PETERS, Photo-Lithographer, Washington, D. C.

UNITED STATES PATENT OFFICE.

TRAVIS PATE, OF DONOHO, SOUTH CAROLINA.

PLOW.

SPECIFICATION forming part of Letters Patent No. 359,465, dated March 15, 1887.

Application filed December 18, 1886. - Serial No. 221,971. (No model.)

*To all whom it may concern:*

Be it known that I, TRAVIS PATE, a citizen of the United States, and a resident of Donoho, in the county of Marion and State of South Carolina, have invented certain new and useful Improvements in Plows; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved plow-frame, showing a common shovel attached to it. Fig. 2 is a perspective view of the frame. Fig. 3 is a perspective view of the frame, showing a sod-cutting blade and a shoe attached to the same; and Fig. 4 is a longitudinal vertical sectional view of the same.

Similar numerals of reference indicate corresponding parts in all the figures.

My invention has relation to frames for plows having shovels or blades for cultivating or similar purposes; and it consists in the improved construction and combination of parts of such a frame, in which the standard bearing the shovel or blade may be set at different angles, as hereinafter more fully described and claimed.

In the accompanying drawings, the numeral 1 indicates the beam, which may be of wood or iron, and which is provided at its forward end with a hook, 2, or clevis, for the attachment of the draft animal or animals, and to the rear end of which the handles may be attached in any suitable manner.

Two pairs of flat slightly-curved bars, 3 and 4, are pivoted with their upper ends upon bolts 6 and 7 to the rear end of the beam and to the beam at a distance from the rear end, and the lower ends of these arms or bars are pivoted upon bolts 8 and 9, passing through the ends of a bar, 10, which forms the foot of the plow.

A flat curved bar, 11, is pivoted upon a bolt, 12, between the upper portions of the forward pair of curved bars, and projects rearward between the rear pair of curved bars, having its rear portion formed with a series of perforations, 13, which may register with two registering-perforations, 14, in the lower portions of the rear curved bars, a suitable bolt or pin, 15, passing through the said perforations. As the lengths of the standards 3 and 4 are not varied when the plow is set at different angles or depths, the bar 10 is always kept in the same relative position to the beam of the plow, and the entire change is effected by means of the removal and replacing of only one bolt.

The blade or shovel 16 is provided with a bolt, 17, passing through it and projecting into the slot formed between the forward pair of curved arms, and this bolt is provided with a nut, 18, bearing against the rear curved edges of the bars, securing the shovel or blade in place, and it will be seen that the angle of the curved bars, and consequently of the blade or shovel, may be changed and adjusted by changing the bolt or pin from one perforation in the curved bar to another, the pitch or angle of the bars being steeper as the curved bar is drawn rearward, and vice versa.

A sod-cutting blade, 19, may be secured to the lower horizontal bar, and this bar may be provided with a shoe or wearing-bar, 20, upon which it may slide upon the ground, the said bar preventing the horizontal bar from being worn by use.

It will be seen that any shape of blade or shovel may be secured by a bolt to the forward pair of curved bars or standards, and that any form of share or sod-cutting blade may be secured to the horizontal bar, and that, if desired, the entire body of a turning-plow may be secured to the frame, and the pitch of the shovel or blade may be changed and adjusted in a moment of time, causing the plow to enter the ground more or less, according to the nature of the soil in which the plow is used and to the kind of work desired to be done.

Having thus described my invention, I claim and desire to secure by Letters Patent of the United States—

1. In a plow-frame, the combination of a beam, two pairs of flat curved standards or bars pivoted at their upper ends to the beam, a flat bar pivoted with its ends between the lower ends of the curved bars, and a curved bar pivoted at its forward end between the forward flat bars and projecting rearward between the rear bars and having means for adjusting it between the said bars, as and for the purpose shown and set forth.

2. In a plow-frame, the combination of a beam, two pairs of flat curved bars or standards pivoted with their upper ends to the beam, a flat bar pivoted at its ends between the lower ends of the curved standards or bars, and a curved flat bar pivoted at its forward end between the forward standards and projecting with its rear end between the rear curved bars or standards, having a series of perforations registering with perforations in the rear standards, and having a pin or bolt for adjusting it between the same, as and for the purpose shown and set forth.

In testimony that I claim the foregoing as my own I have hereunto affixed my signature in presence of two witnesses.

TRAVIS PATE.

Witnesses:
N. E. STAFFORD,
H. M. STACKHOUSE.